United States Patent [19]

Grantland et al.

[11] Patent Number: 4,896,348
[45] Date of Patent: Jan. 23, 1990

[54] PAYSTATION MONITOR CIRCUIT TO PREVENT FRAUDULENT USE

[75] Inventors: Gary Grantland, Hartselle; Attle D. Johnson, Somerville, both of Ala.

[73] Assignee: Palco Telecom Inc., Nashville, Tenn.

[21] Appl. No.: 214,476

[22] Filed: Jul. 1, 1988

[51] Int. Cl.[4] ............................................. H04M 17/02
[52] U.S. Cl. ....................................... 379/145; 379/146
[58] Field of Search ............... 379/145, 146, 147, 143, 379/155, 154, 132

[56] References Cited

U.S. PATENT DOCUMENTS

| 3,428,751 | 2/1969 | Edington ............................... 379/145 |
| 3,814,907 | 6/1974 | Edington et al. ..................... 379/146 |
| 3,890,468 | 6/1975 | Burns et al. ......................... 379/146 |
| 4,429,183 | 1/1984 | Nemecsek et al. ................... 379/145 |
| 4,567,325 | 1/1986 | Crouch et al. ....................... 379/145 |

FOREIGN PATENT DOCUMENTS

| 2395557 | 1/1979 | France ................................. 379/145 |
| 1172069 | 8/1985 | U.S.S.R. .............................. 379/145 |

*Primary Examiner*—Robert Lev
*Attorney, Agent, or Firm*—Robert J. Black

[57] ABSTRACT

A paystation circuit that monitors coin battery signals, hookswitch detect signals and initial rate conditions to provide proper reset signals to the totalizer circuit enabling and/or disabling the dial keypad in order to prevent fraudulent paystation usage.

7 Claims, 1 Drawing Sheet

PAYSTATION MONITOR CIRCUIT TO PREVENT FRAUDULENT USE

BACKGROUND OF THE INVENTION

1. FIELD OF THE INVENTION

This invention relates to telephone paystations and more particularly to a paystation modification that prevents users from fraudulent use of the telephone instrument.

2. DESCRIPTION OF THE BACKGROUND ART

When the Model 120B paystation telephone, as manufactured by Palco Telecom Inc., is utilized in those locations where connections are made to a digital telephone central office, it is desirable to provide modification for the paystation circuitry to prevent users from fraudulent use of the telephone instrument by means of a short disconnect signal thus returning to the "off-hook" condition before or during coin battery operation. When this condition takes place, the telephone instrument will remain in a state where the user may be required to deposit only a single coin (as small as a five cent piece) to condition the instrument for proper usage. This situation takes place usually in digital offices and is not found in most older analog offices because of the nature of the techniques employed in such offices where they detect "on-hook" and "off-hook" conditions and the speed in which they connect and remove coin battery signals.

Paystations that are designed to work in the emergency prepay mode do not require the usual coin deposit to enable the calling device (dial or tone keypad). This arrangement is created so that users may call emergency numbers (911, etc.) without making coin deposits. If the user dials a number other than an emergency number designated by the central office, the office then will perform a coin test to determine if the initial rate of coins have been deposited. This test then looks for the presence of ground current or a difference in current through the two loop conductors. When the initial rate has been deposited the paystation connects a load, usually the coin relay circuit, to earth ground. This load then provides the necessary current path back to the central office to indicate the presence of the initial coin deposit has been made.

In the prepay mode of operation, deposit of coins up to the initial rate is typically required before the calling device is enabled. Also, when the initial rate has been deposited the paystation is conditioned to connect a load to ground to signal the telephone central office that indeed the initial rate has been deposited.

After the call is terminated, the paystation condition is then set to enable the collect or refund of any coins that have been deposited. When the telephone paystation first goes off-hook the paystation is set to that condition where no coins have been deposited, the ground path that indicates that the initial rate deposit has been made is removed.

In the aforementioned 120B paystation, a condition exists where that ground path to the coin relay is not cleared and the telephone remains in the prepay mode with the calling device not disabled. Thus, under such conditions, all that is required is the deposit of a single coin to make the mechanical switch in the coin relay close, thus establishing the ground path to satisfy the central office requirement.

SUMMARY OF THE INVENTION

The present invention consists of a modification to the 120B telephone paystation includes an oscillator and an associated gate circuit which functions to turn the oscillator on when a positive signal is generated at the input of the oscillator. This circuit then produces a string of reset pulses at its output after being latched on by a preceding flip-flop circuit which is in response to the presence of a hookswitch reset signal at the input of the off-hook reset circuit. The oscillator is disabled by the latch when a reset signal is detected. This arrangement then guarantees a reset condition regardless of the coin battery signal condition at the reset pulse output gate circuitry.

The signal from the central office battery circuit is normally high as is the input from the totalizer circuit. These signals are gated to provide a low level at the set output from the circuitry which extends to the rate relay. If coin battery signal is applied after the off-hook condition and before the initial rate is established, input to the gate circuit output that goes to the set lead extending to the rate relay will be high and input to other input of the same gate will be low. This arrangement then produces a signal at the driver circuit for the reset output portion which extends to the rate relay and also at the output of the circuitry used to turn on the aforementioned flip-flop. When the coin battery signal is removed the output of that same circuitry which is gated in the flip-flop, will go low setting the latch and turning on the oscillator. The oscillator will then run until the latch is reset by a rate relay reset output which will operate to reset the latch. If the initial rate is esablished before coin battery is applied, the rate relay set output will be operated to disable the output circuitry that is used to maintain the latch in the on condition. This arrangement prevents the latch from being operated by coin battery.

The circuitry of the present invention as modified will provide the same set and reset functions as in the prior art and will also guarantee a reset after coin battery if a reset occurs before coin battery clears the initial rate and sets the input from the totalizer to the high condition. This circuit will also provide a reset after coin battery if the hookswitch detect occurred during coin battery.

Thus, by monitoring a coin battery signal, hookswitch detect signal and initial rate condition, the present modification to the 120B paystation telephone will provide the proper rest signals to the totalizer circuit, enable and/or disable the dial and or keypad and connect and disconnect the coin relay ground path. The circuit will operate properly even if the normal reset signal occurs before coin battery, during coin battery or after the presence of coin battery.

DESCRIPTION OF THE PREFERRED EMBODIMENT

Figure 1:
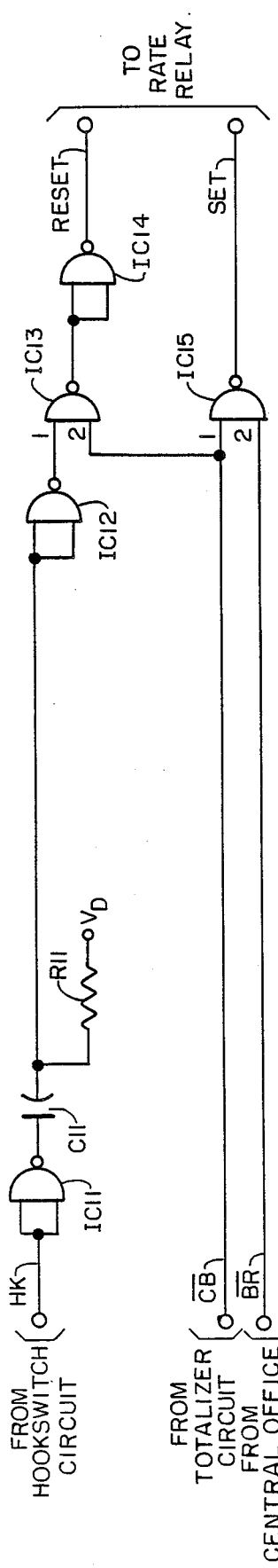
FIG. 1, labeled "Prior Art", is a simplified schematic of the off-hook reset circuit of the type 120B paystation telephone as manufactured by Palco Telecom Inc.

Referring first to FIG. 1, to facilitate understanding of the 120B paystation off-hook reset circuit, the following description is given:

the hookswitch input signal in the hookswitch circuit at terminal HK goes to both inputs of integrated circuit IC11 which functions as a nand gate and because of both input terminals being tied together an inverter, thus the output will go high from integrated circuit IC11 after the presence of an off-hook signal when loop current has been established for 29 milliseconds after a loss of loop current for 174 milliseconds. Capacitor C11 and resistor R11 provide a negative pulse to the input of integrated circuit IC12 which also functions as a nand gate inverter. The output of integrated circuit IC12 is normally low and provides a positive pulse to the number one input of integrated circuit IC13 which functions as a nand gate. Number two input of integrated circuit IC13 is normally high and goes low during coin battery (collect or refund operation). The $\overline{CB}$ input from the totalizer circuit is high, a positive pulse at integrated circuit IC12 will produce a positive pulse at the reset output extending to the rate relay. This pulse also operates to reset the totalizer to indicate that no coins have been deposited and also to disable the dial or keypad if the instrument is used in the prepay mode. When the initial rate has been deposited the $\overline{BR}$ input from the totalizer will then go low. This arrangement then produces a positive signal at the set output from the present reset circuit which extends to the rate relay. This signal is then utilized to enable the dial or keypad and establish the ground path through the coin relay.

Before the initial rate has been established, input $\overline{BR}$ from the totalizer is in the high condition. Should a coin battery signal be input to integrated circuit IC15, which functions as a nand gate, the set output will go high to provide a path to the coin relay for collecting or refunding coins under the initial rate.

It can thus be seen from the aforementioned description and from reference to FIG. 1 that if the hookswitch reset signal occurs during coin battery, a reset condition will not occur. If the hookswitch reset occurs just before coin battery, the reset condition will occur, however, the coin battery signal at $\overline{CB}$ will produce a set condition and establish a ground path for the ground relay.

Figure 2:
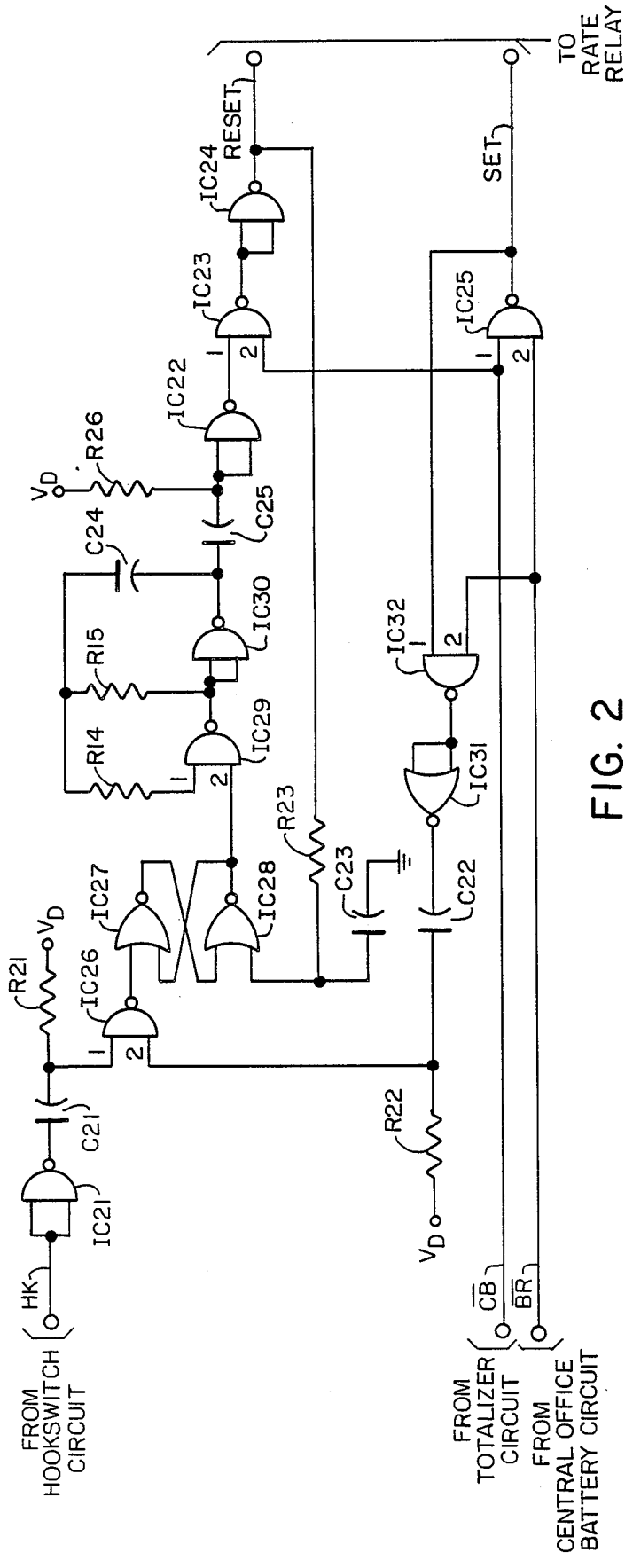
FIG. 2 is a simplified schematic of the 120B paystation off-hook reset circuit as modified in accordance with the present invention.

Referring now to FIG. 2, the circuit of the present invention is shown which was designed to overcome the above outlined conditions. FIG. 2 consists of the same circuit as FIG. 1 with additional conditions or circuitry inserted between the output of capacitor C11 of FIG. 1 and the input to nand gate IC12. Referring now to FIG. 2, integrated circuit IC29 and IC30 as well as resistors R14, R15 and capacitor C24, form an oscillator which is gated on when a positive signal is present at pin 2 of integrated circuit IC29 which forms a portion of the oscillator mentioned above. This oscillator circuit produces a string of reset pulses at the pin 3 output of integrated circuit IC30. Integrated circuits IC29 and IC28 and the associated wiring connected thereto and therebetween, form a latch which enables the reset oscillator, consisting of integrated circuits IC29 and IC30, when a hookswitch signal is present at the HK input from the hookswitch circuit. The aforementioned oscillator is disabled by the latch when a reset signal is detected at pin 2 of integrated circuit IC28 of the above noted latch circuitry. This arrangement guarantees a reset condition regardless of the coin battery signal condition at pin 2 of integrated circuit IC23 gate circuit.

When the telephone paystation instrument initially goes off-hook, the $\overline{BR}$ input is normally high and the $\overline{CB}$ input is normally high. This arrangement provides a low level at the set output. If a coin battery signal is applied after the off-hook condition and before the initial rate is established, the input to integrated circuit IC25 at pin 2 will be high and the input at pin 1 will be low. When the coin battery signal is removed, the output at pin 3 integrated circuit inverter IC31 will go low setting the latch consisting of integrated circuits IC27 and IC28 and turning on the oscillator consisting of integrated circuits IC2 and IC30. The oscillator will then run until the latch is reset by a pulse from the output of inverter integrated circuit IC31, driving integrated circuit IC28 at pin 2 by resetting the latch. If the initial rate is established before coin battery is applied, integrated circuit IC25 at its output 3 will disable integrated gate circuit IC32 to prevent the latch from being operated by coin battery.

In summary, the above described circuit modifications provide the same set and reset functions as those found in the prior art and also guarantee a reset after coin battery if a reset occurred before coin battery clearing the initial rate and setting $\overline{BR}$ input to the high condition. This circuit will also provide a reset after coin battery if the hookswitch detect occurs during the coin battery.

It will be obvious to those skilled in the art that numerous modifications can be made to the present invention without departing from the spirit of the present invention which shall be limited only by the scope of the claims appended hereto.

What is claimed is:

1. An off-hook reset circuit for use in a telephone paystation, said paystation including, a calling device, connections to a telephone central office, a rate relay, a totalizer circuit, a hookswitch circuit and a central office battery circuit;
   said reset circuit comprising:
   a latch circuit;
   a first gate circuit connected between said hookswitch circuit and said latch circuit operated to reset said latch circuit in response to a signal from said hookswitch circuit;
   an oscillator circuit connected to said latch, enabled to generate a train of reset pulses in response to said latch being reset;
   second gating means connected between said oscillator and said rate relay operated to gate a reset pulse to said rate relay;
   whereby said totalizer circuit is reset and said calling device is disabled.

2. An off-hook reset circuit as claimed in claim 1, wherein:
   there is further included a circuit connection between said second gate and said latch circuit operated to conduct to reset pulse to set said latch;
   and said oscillator disabled in response to said latch being set.

3. An off-hook reset circuit as claimed in claim 1, wherein:
   there is further included signal inversion means connected between said oscillator and said second gate circuit.

4. An off-hook reset circuit as claimed in claim 2, wherein:
   there is further included signal inversion means connected between said second gate circuit and said rate relay.

5. An off-hook reset circuit as claimed in claim 2, wherein:
   there is further included a third gate circuit connected between said central office battery circuit and said rate relay; and a circuit connection forrm said totalizer circuit to said third gate circuit, said third gate circuit operated in response to a signal from said central office battery circuit to couple a signal to said rate relay.

6. An off-hook reset circuit as claimed in claim 5, wherein:
   there is further included a fourth gate circuit connected between said third gate circuit and said first gate circuit operated in response to removal of said signal from said coin battery circuit to reset said latch and enable said oscillator.

7. An off-hook reset circuit as claimed in claim 6, wherein:
   there is further included signal inversion means connected between said fourth gate circuit and said first gate circuit.

* * * * *